United States Patent Office 3,472,867
Patented Oct. 14, 1969

3,472,867
4,5-DIHYDROXY, 4,5-DIMETHOXY AND 4,5-DIETHOXY 2-NITRIMINOIMIDAZOLIDINES
Andrew Harper Dinwoodie, Dalry, and James McAllan Cormack Thompson, Seamill, Scotland, assignors, by mesne assignments, to the United States of America as represented by the Secretary of the Navy
No Drawing. Filed Dec. 9, 1966, Ser. No. 600,381
Claims priority, application Great Britain, Feb. 28, 1966, 8,763/66
Int. Cl. C07d 49/00, 49/34
U.S. Cl. 260—309.7    4 Claims

ABSTRACT OF THE DISCLOSURE

New imidazolidine compounds which are 4,5-dihydroxy-, 4,5-dimethoxy- and 4,5-diethoxy-2-nitriminoimidazolidines. The 4,5-dihydroxy compound is useful as an energetic constituent of propellant compositions. The 4,5 dialkoxy compounds are slow acting nitrogenous fertilizers. The 4,5-dihydroxy compound is prepared by reacting nitroguanidine with glyoxal under aqueous alkaline conditions. The 4,5-dialkoxy compounds are prepared by etherification of the 4,5-dihydroxy compound using anhydrous methanol or ethanol and concentrated hydrochloric acid.

---

This invention relates to a new imidazolidine derivative 4,5-dihydroxy-2-nitriminoimidazolidine and certain ether derivatives thereof, and to the preparation of these compounds.

In accordance with the invention, 4,5-dihydroxy-2-nitriminoimidazolidine is prepared by reacting nitroguanidine with glyoxal under alkaline conditions. The reaction is believed to be:

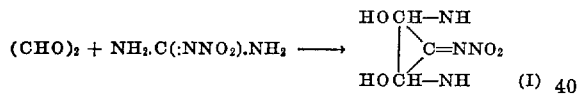
$$(CHO)_2 + NH_2.C(:NNO_2).NH_2 \longrightarrow \begin{array}{c} HOCH-NH \\ \phantom{HOCH-N}\diagdown \\ \phantom{HOCH-NH}C=NNO_2 \\ \phantom{HOCH-N}\diagup \\ HOCH-NH \end{array} \quad (I)$$

The above reaction adopts the diamino-nitrimine formula for nitroguanidine rather than the imino-nitramine formula which is also known to exist, because our examination of the product indicates the symmetrical Formula I shown above rather than the unsymmetrical compound 4,5-dihydroxy-1-nitro-imidazolidin-2-imine which would be expected from the iminonitramine formula. However, the possibility that the chemical structure of our new compound may be the unsymmetrical formula or a hybrid of the symmetrical and unsymmetrical formulae cannot be entirely excluded.

The reaction may conveniently be carried out in an aqueous reaction medium and at room temperature, but the quantity of water should preferably be only the minimum required to dissolve the reactants to preclude excessive dissolution of the product. It is convenient to use glyoxal in the form of its polymeric monohydrate and the reagents are conveniently present in substantially equimolar quantities although the molar ratio may vary over a wide range. The reaction medium may conveniently be rendered alkaline with sodium carbonate or bicarbonate. The product may be isolated by filtration or by evaporation of the aqueous reaction medium.

The compound of the invention is reactive and is a useful energetic constituent of propellant compositions and a valuable intermediate for the preparation of other organic compounds. For example, the hydroxyl groups are readily etherified. This compound has a high nitrogen content and is slightly soluble in water, and is therefore a suitable compound for use as a slow acting nitrogenous fertilizer. Readily prepared ethers include the alkoxy-substituted derivatives such as for example methoxy and ethoxy derivatives.

The compounds of the invention have the formula:

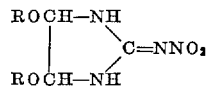
$$\begin{array}{c} ROCH-NH \\ \phantom{ROCH-N}\diagdown \\ \phantom{ROCH-NH}C=NNO_2 \\ \phantom{ROCH-N}\diagup \\ ROCH-NH \end{array}$$

wherein R is hydrogen, methyl or ethyl.

The invention is further illustrated by the following examples wherein all parts and percentages are by weight.

EXAMPLE 1

15.2 parts of glyoxal monohydrate were dissolved in 30 parts of warm water, cooled to room temperature, and 0.5 parts of sodium bicarbonate and 208 parts of nitroguanidine (i.e. equimolar with the glyoxal) were added and the mixture stirred. There was a small heat evolution, and the nitroguanidine dissolved slowly. Some nitroguanidine was still undissolved when the product started to precipitate. After standing overnight, the mixture was filtered, the filtrate washed with water, drained and dried to give 24 parts (74% of theory) of 4,5-dihydroxy-2-nitriminoimidazolidine in the form of a white solid, which was recrystallised from aqueous acetic acid to give colourless crystals. On heating, the crystals developed a yellow colour at about 150° C. and sharp decomposition followed at 169° C. Elemental analysis of the crystalline product showed it to contain 21.8% carbon, 4.5% hydrogen and 36.2% nitrogen. The molecular weight of the compound, determined ebullioscopically in acetone solution, was found to be 140. 4,5-dihydroxy-2-nitriminoimidazolidine, $C_3H_6N_4O_4$, requires 22.2% carbon, 3.7% hydrogen, 34.6% nitrogen and a molecular weight of 162. The infra-red spectrum of the compound showed strong absorptions at 3.0μ, attributable to —OH or —NH, at 6.3μ, attributable to N—NO_2, and also at 6.5, 7.8–8.0, 9.2 and 9.65μ. Weaker absorptions were also shown at 3.2μ, attributable to —OH or —NH and also at 8.9, 11.85, 12.3, 13.3 and 13.9–14.0μ.

EXAMPLE 2

15.2 parts of glyoxal monohydrate and 13.9 parts of nitroguanidine (i.e. a molar ratio of 3:2) were reacted together as described in Example 1. The reaction gave 17.1 parts (79% of theory, based on nitroguanidine) of a product which was shown to be identical to the 4,5-dihydroxy-2-nitriminoimidazolidine product in Example 1.

EXAMPLE 3

15.2 parts of glyoxal monohydrate and 6.94 parts of nitroguanidine (i.e. a molar ratio of 3:1) were reacted together as described in Example 1. 3.2 parts (30% of theory, based on nitroguanidine) of 4,5-dihydroxy-2-nitriminoimidazolidine identical to the product of Example 1 were obtained.

EXAMPLE 4

Stirring 2 parts of 4,5-dihydroxy-2-nitriminoimidazolidine as produced in Example 1 with 79 parts of anhydrous methanol in the presence of 0.4 part of concentrated hydrochloric acid for 6 hours gave a clear solution. This solution was allowed to stand for 24 hours before adding 2 parts of sodium bicarbonate, stirring for one hour, filtering and then evaporating the filtrate under reduced pressure to one third of its original volume. 1 part (43% of theory) of a white crystalline compound was precipitated and identified as 4,5-dimethoxy-2-nitriminoimidazolidine. The compound melted with decomposition at 174–5° C. and was found to contain 31.3% carbon, 5.2% hydrogen, 30.7% nitrogen and 32.4% methoxy groups. The molecular weight of the compound, determined ebullioscopically in acetone, was found to be 190. 4,5-dimethoxy - 2-nitriminoimidazolidine, $C_5H_{10}N_4O_4$, requires 31.6% carbon, 5.3% hydrogen, 29.5% nitrogen, 32.6% methoxy groups and a molecular weight of 190.

The infra-red spectrum of the compound showed strong absorptions at 2.95 and 3.15μ, attributable to —NH, at 6.3μ, attributable to —N.NO$_2$, and 9.1 and 9.4μ, attributable to —OCH$_3$, and also at 6.6, 6.85, 7.6, 7.85, 8.2, 8.45, 10.5 and 10.75μ. Weaker absorptions were shown at 10.05, 12.0, 12.3, 12.85, 13.4 and 13.8μ. The proton magnetic resonance spectrum at 60 megacycles/second of the compound in acetone solution, using tetramethylsilane as internal reference, showed single peaks at 6.56, 5.01 and 0.98τ in the ratio 6:2:2,, attributable to the hydrogen nuclei of the methoxy groups, and to those on the carbon atoms and on the nitrogen atoms of the imidazolidine ring, respectively. The simple proton magnetic resonance spectrum indicates that the compound has the symmetrical 4,5-dimethoxy-2-nitriminoimidazolidine structure.

EXAMPLE 5

5 parts of 4,5-dihydroxy-2-nitriminoimidazolidine were dissolved in 240 parts of anhydrous ethanol by warming to about 60° C. After cooling to room temperature 1 part of concentrated hydrochloric acid was added, the mixture stirred thoroughly and then set aside overnight. The clear solution was evaporated to about one sixth of its original volume to give 3.25 parts of colourless crystals which showed slight softening from about 150° C. and melted with decomposition to a brown melt at 162–163° C. Further concentration of the mother liquor gave another 1.5 parts of the product which softened from about 161° C. and melted to a brown melt with decomposition at 164–165° C. The total yield of this slightly impure material was about 70%. Recrystallisation from ethanol gave material which discoloured at about 164° C. and melted with decomposition at 167° C. and was found to contain 38.5% carbon, 6.2% hydrogen, 26.4% nitrogen and 41.7% ethoxy groups. 4,5-diethoxy-2-nitriminoimidazolidine, C$_7$H$_{14}$N$_4$O$_4$, requires 38.5% carbon, 6.4% hydrogen, 25.7% nitrogen and 41.3% ethoxy groups.

The infra-red spectrum of the compound showed strong absorptions at 3.1μ, attributable to —NH, at 6.3μ, attributable to —N.NO$_2$, at 9.0 and 9.3μ, attributable to —OC$_2$H$_5$, and also at 6.5, 7.4, 7.55, 7.75 to 7.95, 8.1 to 8.2 and 10.3 to 10.45μ. Weaker absorptions were shown at 8.6, 9.8, 11.55, 12.0 to 12.1 and 12.75μ.

What we claim is:
1. 4,5-dihydroxy-2-nitriminoimidazolidine.
2. 4,5-dimethoxy-2-nitriminoimidazolidine.
3. 4,5-diethoxy-2-nitriminoimidazolidine.
4. An imidazolidine compound of the formula:

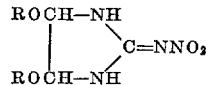

wherein R is a radical selected from the group consisting of hydrogen, methyl and ethyl.

References Cited

UNITED STATES PATENTS

| | | | |
|---|---|---|---|
| 3,029,164 | 4/1962 | Seki et al. | 260—309.7 |
| 3,079,279 | 2/1963 | Van Loo | 260—309.7 |
| 3,091,617 | 5/1963 | Burris | 260—309.7 |
| 3,112,156 | 11/1963 | Vail et al. | 260—309.7 |
| 3,209,010 | 9/1965 | Gagliardi | 260—309.7 |

OTHER REFERENCES

Hafner et al.: Chem. Abst., vol. 54, columns 5689–90 (1960), QDI.A51.

HENRY R. JILES, Primary Examiner
NATALIE TROUSOF, Assistant Examiner

U.S. Cl. X.R.

71—92; 149—92; 260—564